(12) United States Patent
Cheriton

(10) Patent No.: US 7,149,216 B1
(45) Date of Patent: Dec. 12, 2006

(54) M-TRIE BASED PACKET PROCESSING

(75) Inventor: David R. Cheriton, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 709 days.

(21) Appl. No.: 09/655,295

(22) Filed: Sep. 5, 2000

(51) Int. Cl.
*H04L 12/28* (2006.01)

(52) U.S. Cl. .................................. 370/392; 370/395.4

(58) Field of Classification Search ............... 370/351, 370/389, 390, 392, 238, 393, 401–405, 408; 703/20, 27, 238; *H04L 12/28, 12/56; G06F 9/34, G06F 9/455, 15/173*
See application file for complete search history.

(56) References Cited

U.S. PATENT DOCUMENTS

| | | | |
|---|---|---|---|
| 4,491,945 A | 1/1985 | Turner | |
| 4,679,189 A | 7/1987 | Olson et al. | |
| 4,893,304 A | 1/1990 | Giacopelli et al. | |
| 5,088,032 A | 2/1992 | Bosack | |
| 5,249,292 A | 9/1993 | Chiappa | |
| 5,271,004 A | 12/1993 | Proctor et al. | |
| 5,309,437 A | 5/1994 | Perlman et al. | |
| 5,434,863 A * | 7/1995 | Onishi et al. ............... | 370/402 |
| 5,440,550 A | 8/1995 | Follett | |
| 5,509,006 A * | 4/1996 | Wilford et al. ............. | 370/401 |
| 5,519,858 A | 5/1996 | Walton et al. | |
| 5,524,254 A | 6/1996 | Morgan et al. | |
| 5,651,002 A | 7/1997 | Van Seters et al. | |
| 5,684,797 A | 11/1997 | Aznar et al. | |
| 5,684,954 A | 11/1997 | Kaiserswerth et al. | |
| 5,774,698 A | 6/1998 | Olnowich | |
| 5,842,224 A | 11/1998 | Fenner | |
| 5,870,382 A | 2/1999 | Tounai et al. | |
| 5,909,440 A | 6/1999 | Ferguson et al. | |
| 6,011,795 A * | 1/2000 | Varghese et al. ............. | 370/392 |
| 6,041,053 A * | 3/2000 | Douceur et al. ............ | 370/389 |
| 6,091,725 A | 7/2000 | Cheriton et al. | |
| 6,157,641 A | 12/2000 | Wilford | |
| 6,212,183 B1 | 4/2001 | Wilford | |

(Continued)

FOREIGN PATENT DOCUMENTS

GB    2350534 A * 11/2000

(Continued)

OTHER PUBLICATIONS

Shang-Tse Chuang et al. "Matching Output Queueing with a Combined Input and Output Queued Switch". Stanford CSL-TR-98-758.

(Continued)

*Primary Examiner*—Huy D. Vu
*Assistant Examiner*—Daniel Ryman
(74) *Attorney, Agent, or Firm*—Hickman Palermo Truong & Becker, LLP

(57) ABSTRACT

In an embodiment, different aspects of a packet header and data included in the packet are singled out for attention, rather that just the four byte IP destination address. Different information is included in nodes of the trie that enables matching and branching on different header fields. In an embodiment, the ACL of a configuration file in a router or switch is compiled into a trie data structure located in the memory of the router or switch. In an embodiment, a trie data structure is used to map a multicast packet header by a sequence of nodes that match on destination address or source address.

30 Claims, 3 Drawing Sheets

U.S. PATENT DOCUMENTS

| | | | |
|---|---|---|---|
| 6,212,184 B1 * | 4/2001 | Venkatachary et al. | 370/392 |
| 6,243,667 B1 * | 6/2001 | Kerr et al. | 703/27 |
| 6,308,219 B1 * | 10/2001 | Hughes | 709/238 |
| 6,385,170 B1 * | 5/2002 | Chiu et al. | 370/235 |
| 6,553,002 B1 * | 4/2003 | Bremer et al. | 370/254 |
| 6,590,894 B1 * | 7/2003 | Kerr et al. | 370/392 |
| 6,704,313 B1 * | 3/2004 | Duret et al. | 370/392 |
| 2001/0012295 A1 | 8/2001 | Wilford | |
| 2001/0051864 A1 | 12/2001 | Kerr et al. | |

FOREIGN PATENT DOCUMENTS

| | | |
|---|---|---|
| WO | WO 94/01828 A1 | 1/1994 |
| WO | WO 96/34479 A1 | 10/1996 |
| WO | WO 9959303 A2 * | 11/1999 |
| WO | WO 200077984 A1 * | 12/2000 |

OTHER PUBLICATIONS

Willibald Doeringer et al. "Routing on Longest-Matching Prefixes". IEEE/ACM Transactions on Networking, vol. 4. No. 1. Feb. 1996.

Jim Duffy. "Cisco goes with the flow". San Jose, Calfornia. May 3, 1996.

Pankaj Gupta et al. "Scheduling Algorithms for an Input-Queued Variable Length Packet Switch". Stanford University. p. 1-34.

Nick McKeown et al. "Bridges, Routers and Switches". Department of Electrical Engineering. Stanford University, Stanford, CA 94305-9030.

Tong-Bi Pei et al. "VLSI Implementation of Routing Tables: Tries and Cams". Department of Electrical Engineering. Center for Telecommunications Research. Columbia University. 1991 IEEE.

Paul F. Tsuchiya. "A Search Algorithm for Table Entries with Non-contiguous Wildcarting". Bellcore.

* cited by examiner

M-TRIE BASED PACKET PROCESSING

BACKGROUND OF THE INVENTION

1. Field of the Invention

This invention relates to use of an expanded data structure (referred to herein as M-trie Plus) for packet processing.

2. Related Art

In a computer network, a router or switch operates to receive messages at its input interfaces and to send messages from its output interfaces. In performing these tasks, the router or switch must generally determine which output interface (if any) is appropriate for forwarding the message. When making this determination, the router or switch is responsive to the destination IP address (for multicast packets, the router or switch is also responsive to the source IP address). Similarly, the router or switch can also be responsive to the source IP address for policy routing.

A first method of identifying an outbound interface for a particular packet is to look up the IP address on the packet in a TRIE data structure, as described in the Incorporated Disclosures.

In a known system described in the Incorporated Disclosures, the router or switch uses each of the four bytes of the destination IP address to perform a lookup in a branching table having a set of up to 256 possible branching entries in a TRIE data structure, terminating in a leaf node in the TRIE upon or before having performed the lookup for each byte of the destination IP address. Thus, it is possible to determine an appropriate output interface for the destination IP address by going through no more than four cycles on the TRIE before coming to a leaf node that specifies the actual handling instructions for the packet.

One drawback to TRIE data structure processing is that it is limited to processing the destination IP address. It would be desirable to expand on this so as to single out other aspects of the packet header beyond the four bytes specifying the destination IP address.

A second drawback to the use of a TRIE for lookups is that access control list (ACL) processing remains separate from routing. In some embodiments, ACL processing is driven by software. Since this process is relatively slow when compared to high-speed routers, ACL processing slows the overall rate at which data packets are forwarded. Depending upon the length of the ACL criteria, router speeds can drop 70% or more.

A third drawback to use of a TRIE is that the nodes and leaves of the TRIE generally do not provide adequate information to direct multicast routing.

Accordingly, it would be desirable to provide an improved technique for looking up information contained in a packet header relevant to routing and access control. This is achieved in an embodiment of the invention which is a novel and nonobvious expansion on an expanded TRIE structure, herein called an M-trie Plus data structure. In addition to providing unicast routing and access control list processing, an M-trie Plus data structure can be used with techniques for multicast routing, ACL processing, CoS (class of service) processing, QoS (quality of service) processing, and the like.

SUMMARY OF THE INVENTION

In a first aspect of the invention, different aspects of the packet header are singled out for attention, rather that just the four byte IP destination address. This allows the M-trie Plus to perform functions that trie data structures were unable to do. Current TRIE structures distinguish only between the leaf and node type elements and are used only for routing. The M-trie Plus extends this and includes different information in the nodes of the TRIE which enables matching and branching on different header fields. The basic building block of all M-trie Plus nodes is an oppointer. The oppointer includes an address and an opcode. In a preferred embodiment, the address included in an oppointer is the address for the next node. The opcode included in an oppointer describes what action the router or switch has to do on the packet label to select the next oppointer leaf on the M-trie Plus. If an oppointer points to the 8 bit termination leaf, the lookup is terminated. High speed packet header processing is achieved by the multiple pipelined threads of the M-trie Plus engine (MPE) and a wide memory bus.

In a second aspect of the invention, the ACL of a configuration file in a router or switch is compiled into an ACL-M-trie Plus data structure which is located in the memory of the router or switch. This has the effect of merging routing and ACL processing in a single device. The M-trie Plus data structure is traversed with respect to information included in the packet header, thereby determining whether a packet should be dropped or forwarded. ACL lists are defined in the configuration file of the router or switch. In a preferred embodiment, there are two forms of access list in the IOS: the standard ACL and the extended ACL. Standard lists are used to control traffic based on one or more source IP addresses. The extended access list provides a finer granularity in controlling traffic. ACL definitions provide a set of criteria that are applied to each packet that is processed by the router or switch. The router or switch decides whether to forward or drop each packet based on whether or not the packet matches the access list criteria. Typical criteria defined in ACLs are source addresses, destination addresses or upper-layer protocols of the packet.

In a third aspect of the invention, the M-trie Plus structure can map a multicast packet header by a sequence of nodes that match a destination address or source address. Each physical port uses the M-trie Plus with the first level nodes matching on the first 8 bits of the destination address, the second level nodes matching on the second 8 bits of the destination address and so on, at each level the nodes correspond to multicast addresses. In other embodiments, the nodes can compare more than just 8 bits.

In a preferred embodiment, the opcode included in a node can specify other operations, such an instruction to compare bytes in the packet header with bytes in a CAM (content addressable memory) or to direct certain types of packets (for example, voice traffic) to a specified output interface.

Incorporated Disclosures

The inventions described herein can be used in conjunction with inventions described in the following applications:

Application Ser. No. 08/886,900, filed Jul. 2, 1997, in the names of Darren Kerr and Barry Bruins, titled "Network Flow Switching and Flow Data Export", assigned to the same assignee, and all pending cases claiming the priority thereof.

Application Ser. No. 08/655,429, filed May 28, 1996, now U.S. Pat. No. 6,243,667 issued on Jun. 5, 2001, in the names of Darren Kerr and Barry Bruins, titled "Network Flow Switching and Flow Data Export", assigned to the same assignee, and all pending cases claiming the priority thereof.

Application Ser. No. 08/581,134, filed Dec. 29, 1995, now U.S. Pa. No. 6,091,725 issued on Jul. 18, 2000, in the names of David Cheriton and Andy Bechtolsheim, titled "A Method for Traffic Management, Traffic Prioritization, Access Control and Packet Forwarding in a Datagram Computer Network", assigned to the same assignee.

Lexicography

Access control lists (ACL)—as used herein, the term "access control lists" is synonymous with the term "traffic filter". In general, it includes a list of the services available on a server, each with a list of the hosts permitted to use the service. ACLs can define the accessibility of networks and hosts through a router or switch because they determine whether packets are dropped or forwarded at the router or switch interfaces.

Content addressable memory (CAM)—as used herein, the terms "CAM" and "Content Addressable Memory" include devices used in a computer system for storing and retrieving information. CAMs have the advantage that they can rapidly flag certain data by linking associated data values with known tags; thus making it possible to perform rapid lookup of the associated data values once the tag is known.

CoS—as used herein, the term "CoS" refers to the class of service such as voice traffic, email traffic, wireless traffic. Many network protocols allow packet headers to include CoS information.

QoS—as used herein, the term "QoS" refers to the quality of service and includes the performance properties of a network service such as throughput, transit delay and priority. Many network protocols allow packets or data streams to include Qos requirements.

TRIE—as used herein, the term "TRIE" refers to a tree-like data structure that is used to determine the routing of data packets by looking to information in the packet header and matching it to information included in the node of the data tree.

M-trie Plus—as used herein, the term "M-trie Plus" includes an extension of the existing TRIE. Instead of mere matching, every node in the tree includes an address and an opcode. This additional information allows the router or switch to look up packet headers and perform simple instructions related thereto relatively rapidly.

M-trie Plus Engine—as used herein, the term "M-trie Plus Engine" is a multi-threaded processor included in a router or switch that services a queue of packet headers.

Oppointer—as used herein, the term "oppointer" derives from the words "opcode" and "pointer". An oppointer is a micro-code structure to the router or switch that includes a 10 bit opcode and a 22 bit address. Each node in the M-trie Plus data structure is specified by an oppointer.

ACL list—as used herein the term "ACL list" refers to a set of criteria which are applied to each packet that is processed by the router or switch. The router or switch decides whether to forward or drop each packet based on whether or not the packet matches the access list criteria.

Standard ACL list—as used herein, the term "standard ACL list" includes lists of qualifiers that are used to control traffic based on one or more source IP addresses. In a preferred embodiment, the IP address qualifier is a 32 bit quantity in dotted decimal format.

Extended ACL list—as used herein, the term "extended ACL list" provides a finer granularity than the standard ACL lists, with respect to criteria used in controlling traffic.

TRIE—as used herein, the term "TRIE" includes data structures that store elements in a tree, including roots, leaves and branches. The path from the root to the leaf is described by a key.

Flow label—as used here, the term "flow label" describes the collection of fields used to identify and classify fields in the packet header, including, without limitation IP source address, destination address, protocol type and layer 4 port numbers.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using one or more general purpose processors or special purpose processors or other circuits adapted to particular process steps and data structures described herein, and that implementation of the process steps and data structures described herein would not require undue experimentation or further invention.

System Elements

Figure 1:
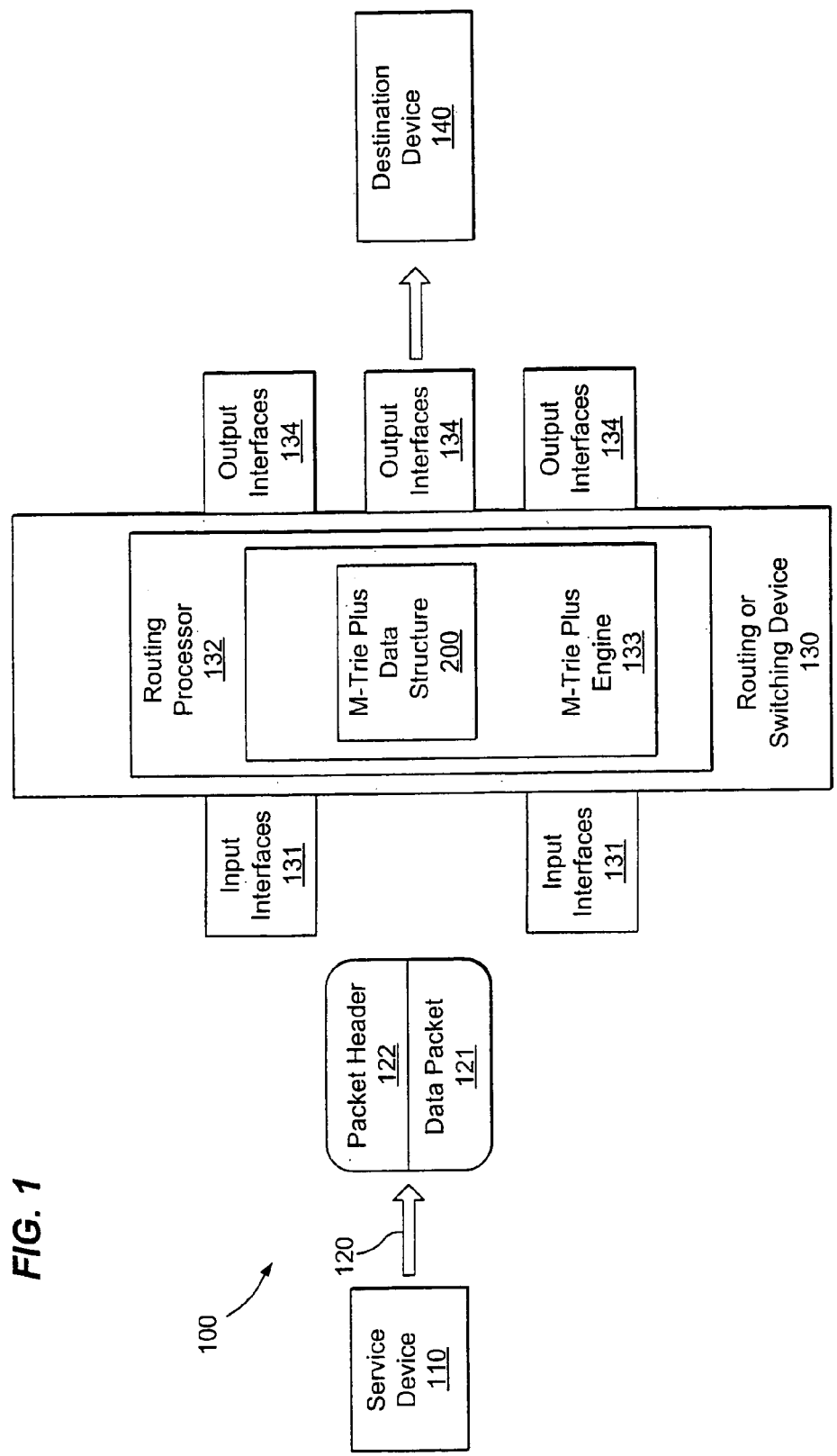
FIG. 1 shows a block diagram of a system that includes an M-trie Plus data structure and a set of oppointers used in routing data packets.

FIG. 1 shows a block diagram of a system that includes an M-trie Plus data structure and a set of oppointers used in routing data packets.

A system 100 includes at least one source device 110, a data stream 120, at least one routing or switching device 130 and at least one destination device 140.

The source device 110 includes any device on a network of networks (an internet) that is identified by its IP (internet protocol) address.

The data stream 120 includes one or more data packets 121 that travel from a source device 110 to one or more destination devices 140. Each data packet 121 includes a packet header 122, which includes information for routing the data packet 121. Although the preferred embodiment of data stream 120 is a unidirectional stream, other embodiments may be bi-directional.

The destination device 140 is any device on a network that c an be specified by its IP address.

The Router or Switching Device

The routing or switching device 130 processes data packets 121 from at least one source device 110 and directs them to at least one destination device 140. The routing or switching device 130 includes one or more input interfaces 131, a routing processor 132, an M-trie plus engine 133, an M-trie data structure 200 and a set of output interfaces 134.

Packets are received one or more input interfaces 131 and processed by the routing processor 132. The routing processor 132 includes a processor and memory for performing the process steps described herein, and may include specific hardware constructed or programmed for performing the process steps described herein. In a preferred embodiment, the routing processor 132 includes a high-performance, highly integrated router chip set using shared memory implemented by multi-bank pipelined SDRAM. Such embodiments are capable of supporting a plurality of OC-48 ports, a plurality of Gigabit ethernet ports and a plurality of 10/100 Megabit ethernet ports.

The M-trie plus engine 133 is a multi-threaded processor and memory that services a queue of packet headers 122 and determines which one or more output interfaces 134 from the set of output interfaces 134 that a particular packet is destined for. The memory of the M-trie plus engine 133 includes an M-trie plus data structure 200.

Figure 2:
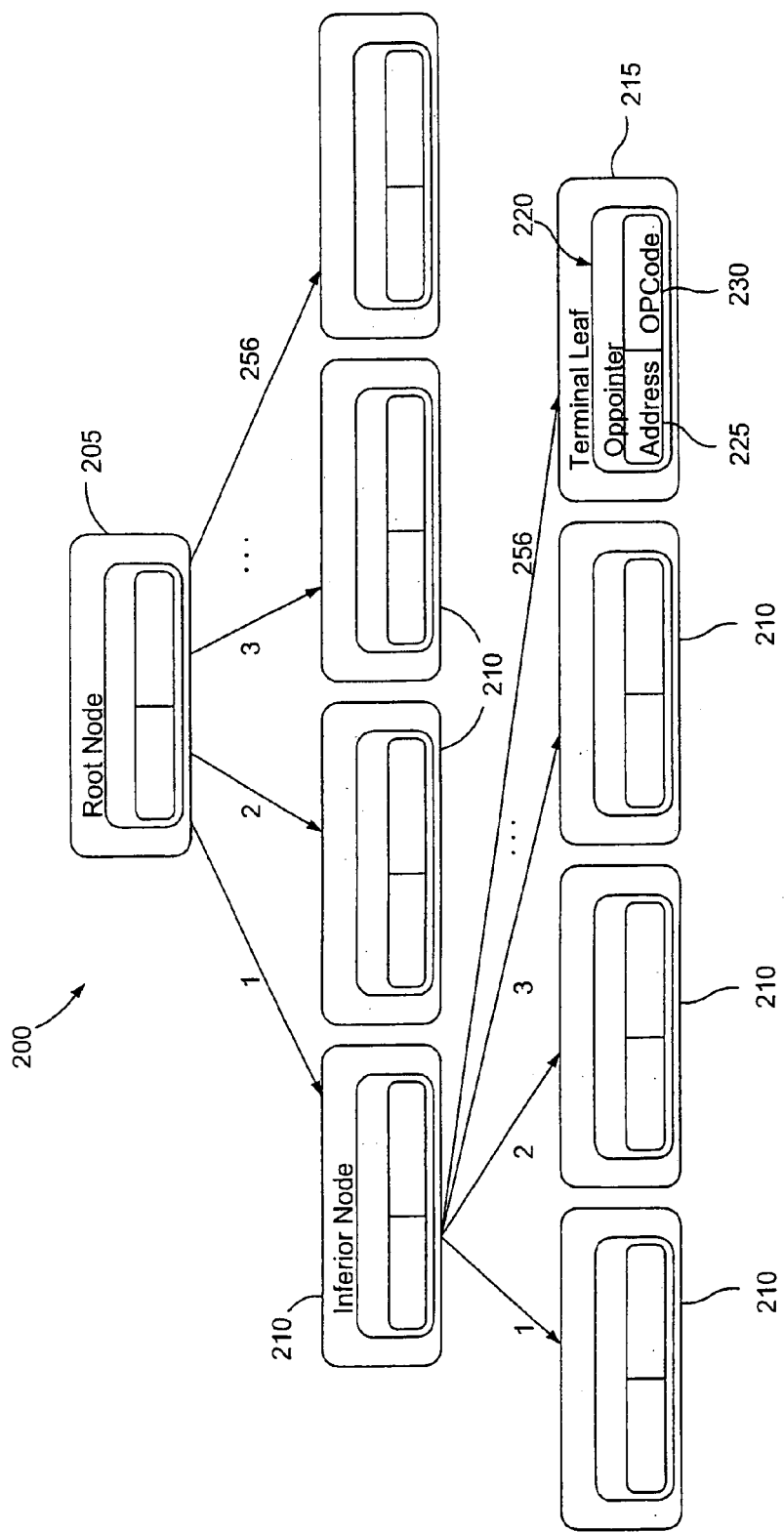
FIG. 2 shows a data structure showing M-trie Plus sub-trees and an oppointer.

FIG. 2 shows a block diagram showing M-trie Plus subtrees and oppointers.

The M-trie plus data structure 200 includes a tree having a root node 205, a plurality of inferior nodes 210 and a terminal leaf node 215. Terminal leaf node 215 is also an example of an inferior node.

The root node 205, inferior nodes 210 and terminal leaf node 215 include an oppointer 220. Each oppointer 220 includes an address 225 and an opcode 230. The address 225 specifies a table and a location in a table where further instructions regarding the packet 121 are found. The opcode 230 includes instructions concerning what to do with the packet 121, including what operations the M-trie Plus engine 133 must execute on the packet header 122 to cause it to compute and fetch the next oppointer. For example, an opcode 230 could include instructions to lookup the destination IP address or the source IP address. Much information can be rapidly processed as the lookup process traverses the plurality of inferior nodes 210 until a terminal leaf node 215 is reached and a decision to drop or pass the packet 121 is made.

Information included in the oppointer 220 provides substantial advantages over M-trie data structures as described in the Incorporated Disclosures. In addition to specifying an output interface 134, this information can be used to direct multicasting, access control, CAM lookups and numerous other processes that would be obvious to one skilled in the art. Moreover, unlike existing M-tries, the M-trie plus technique can be used with any four bytes of the packet header, not just the four bytes that specify the destination source.

Depending on the type of information in the opcode 230, the root node 205, inferior nodes 210 and terminal leaf node 215 can be categorized as demultiplexing (denux) nodes, matching modes, hashing nodes or specialized nodes.

Demultiplexing nodes demultiplex into different M-trie plus branches based on the value of the selected byte in the packet header.

Matching nodes compare the given byte value of the packet label to given node data. A match node matches on one value and provides two subnodes corresponding to "match" and "not match". The result indexes the next oppointer 220. These matching nodes can also compare more than a byte.

Hashing nodes hash into different M-trie plus branches based on the value of the selected byte in the packet header 122.

Specialized nodes perform operations that cannot be performed by other nodes. These specialized operations include termination of the lookup process. Unlike M-trie termination, which relies upon a LSB-bit special mechanism to distinguish between nodes and leaves, termination of a lookup in an M-trie plus data structure 200 relies upon a termination leaf containing an 8 bit term instruction.

In a preferred embodiment, one of the subtrees of the M-trie Plus data structure 200 includes an M-trie Plus-ACL data structure. Compiling this data into a subtree rather than a standard M-trie minimizes the lookup count and memory usage.

Method of Use

Figure 3:
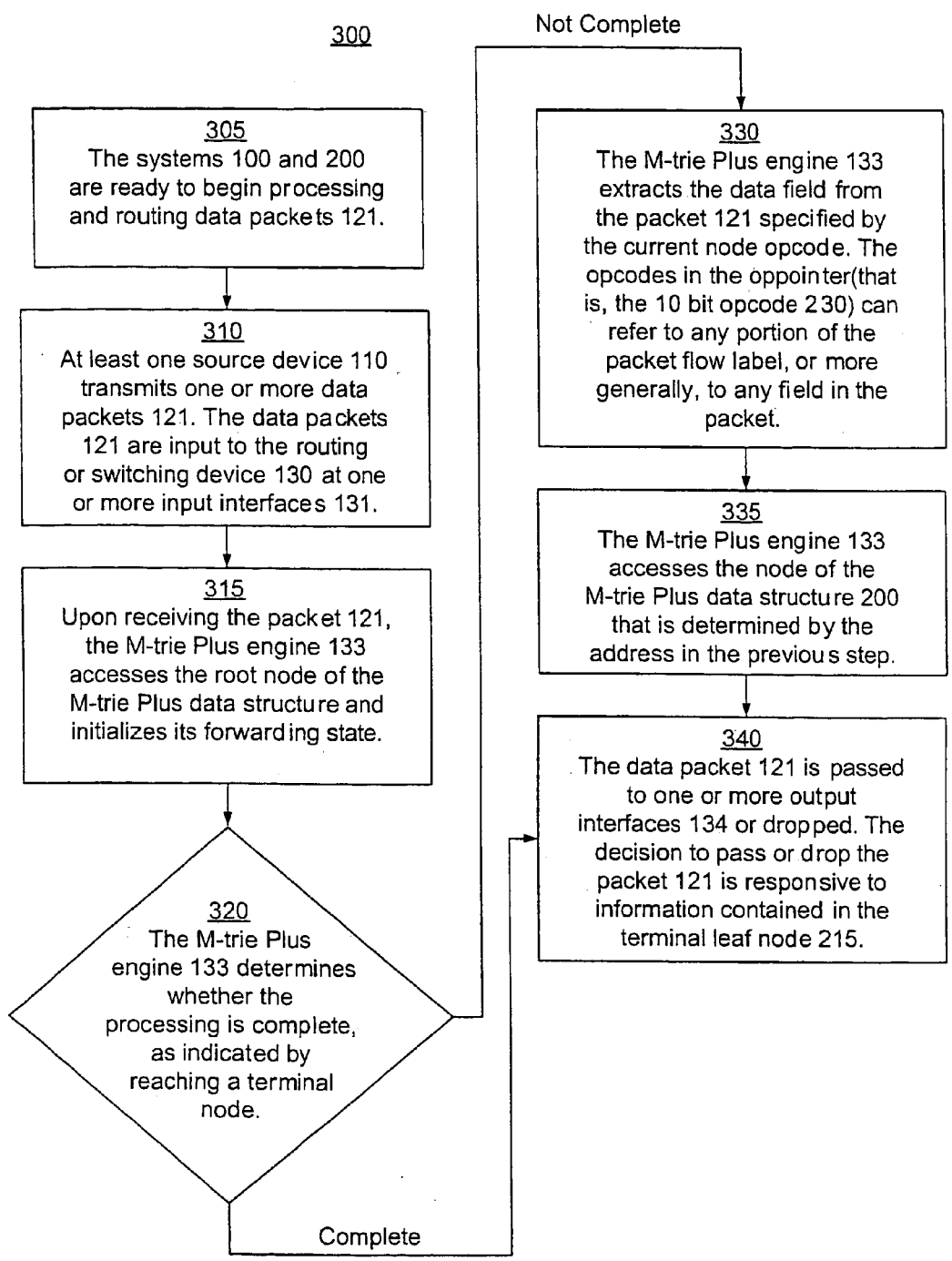
FIG. 3 shows a process flow diagram of a method for using a system that includes an M-trie Plus data structure and a set of oppointers used in routing data packets and access control.

FIG. 3 shows a process flow diagram of a method for using a system that includes an M-trie Plus data structure and a set of oppointers used in routing data packets for access control.

The step 300 is performed by the systems 100 and 200. Although the step 300 is described serially, the steps of the step 300 can be performed by separate elements in conjunction or parallel, whether asynchronously, in a pipelined manner, or otherwise. In broad overview, the step 300 can include routing of packets, multicasting, deciding whether packets can be dropped as a function of QoS or CoS and other aspects related to processing of packet headers.

At a flow point 300, the systems 100 and 200 are ready to begin processing and routing data packets 121.

At a step 310, at least one source device 110 transmits one or more data packets 121. The data packets 121 are input to the routing or switching device 130 at one or more input interfaces 131.

At a step 315, the M-trie Plus engine 133 accesses the root node of the M-trie Plus data structure 150 and initializes its forwarding state.

At a step 320, the M-trie Plus engine 133 determines whether the processing is complete, as indicated by reaching a terminal node. If processing is complete, the method 300 proceeds at step 340. If processing is not complete, the method 300 proceeds at step 330.

At a step 330, the M-trie Plus engine 133 extracts the data field from the packet 121 specified by the current node opcode. The opcodes in the oppointer (that is, the 10 bit opcode 230) can refer to any portion of the packet flow label, or more generally, to any field in the packet. For example, the opcode may refer to the IP address for the source device 110, the IP address for the destination device 140 or the protocol type for the packet 121.

For example (without limitation) a first oppointer can have an opcode 230 specifying match on protocol field and a pointer (that is address 225) to another node in the M-Trie Plus data structure 200. This node may have an opcode 230 that specifies hash and demux on the last byte of the source address. The next oppointer can specify to multiplex on the second byte of the destination address.

In this way, the router can traverse an access control list, if such a list is imposed) (i.e. whether the intended destination device is authorized to receive a particular packet), QoS parameters (whether a percentage of packets in a data stream for one of one or more destination devices should be dropped) and other parameters that would be obvious to one skilled in the art of packet processing. In a preferred embodiment, the lookup could be either relatively simple and involve as few as a single byte or be relatively complex and involve several hundred oppointers.

In a step 335, the M-trie Plus engine 133 accesses the node of the M-trie Plus data structure 200 that is determined by the address in step 330. The step 300 proceeds at step 320.

In a step 340, the data packet 121 is passed to one or more output interfaces 134 or dropped. The decision to pass or drop the packet 121 is responsive to information contained in the terminal leaf node 215.

ALTERNATIVE EMBODIMENTS

Although preferred embodiments are disclosed herein, many variations are possible which remain within the concept, scope, and spirit of the invention, and these variations would become clear to those skilled in the art after perusal of this application. In particular, the invention can be applied to matching and classification of HTTP headers.

The invention claimed is:

1. A method for routing or switching data packets, comprising the computer-implemented steps of:
receiving a data packet at an input interface on a router or switch;
looking up information in the header of said data packet in an expanded M-trie data structure, wherein said expanded M-trie data structure is organized as a multi-level tree including a root node, inferior nodes, and terminal nodes, wherein each node stores values for an address and an opcode, wherein said opcode specifies:
a particular field of a plurality of fields in the header of said data packet;
an operation that is to be performed on the data stored in said particular field,
wherein said operation is one of a plurality of operations that said opcode can specify; and
terminating said step of looking up information; and
routing said data packet at one or more output interfaces on said router or switch bases on the looked up information.

2. A method as in claim 1, wherein said address includes the address of a node in said expanded M-trie data structure that is to be traversed.

3. A method as in claim 1, wherein said expanded M-trie data structure includes a set of access control parameters.

4. A method as in claim 1, wherein said expanded M-trie data structure includes a set of Quality of Service (QoS) parameters.

5. A method as in claim 1, wherein said expanded M-trie data structure includes a set of Class of Service (CoS) parameters.

6. A method as in claim 1, wherein said nodes include opcodes for demultiplexing, opcodes for matching, and opcodes for hashing.

7. A method as in claim 6, wherein said opcodes for demultiplexing include instructions to demultiplex into branches of said expanded M-trie data structure based on contents of a byte of said packet header that is being read.

8. A method as in claim 6, wherein said opcodes for matching include instructions to compare the contents of a given byte of the flow label to given node data.

9. A method as in claim 6, wherein said opcodes for hashing include instructions to hash into different M-trie plus branches based on the contents of a given byte in said packet header.

10. A method as recited in claim 1, further comprising routing said data packet at one or more output interfaces on said router or said switch.

11. A method as recited in claim 1, further comprising determining, based on one or more Access Control List (ACL) criteria stored in said expanded M-trie data structure, whether to drop or forward said data packet.

12. A method as recited in claim 11, wherein determining whether to drop or forward said data packet comprises matching said information in the header of said data packet to the one or more ACL criteria stored in said expanded M-trie data structure.

13. A method as recited in claim 11, wherein said one or more ACL criteria include at least one of a source address, destination address, and upper-layer protocol information.

14. A method as recited in claim 11, wherein said one or more ACL criteria are stored in a sub-tree of said expanded M-trie data structure.

15. An apparatus for routing or switching data packets, comprising:
means for storing in memory an M-trie data structure, said data structure organized as a multi-level tree having a set of nodes, including a root node, inferior nodes and terminal nodes, wherein each node stores values for an address and an opcode, wherein said opcode specifies:
a particular field of a plurality of fields of data packet headers; and
an operation that is to be performed on the data stored in said particular field,
wherein said operation is one of a plurality of operations that said opcode can specify;
means for receiving a data packet at an input interface on a router or switch, wherein the data packet includes information in at least a header with at least a field that is used by said M-trie data structure to indicate an action for said device to perform in order to select a leaf associated with said M-trie data structure;
means for looking up the information, wherein the looking up includes performing the action; and
means for routing said data packet at one or more output interfaces on said router or said switch based on the looked up information.

16. A method for routing or switching data packets, comprising the computer-implemented steps of:
storing in memory an M-trie data structure, said data structure organized as a multi-level tree having a set of nodes, including a root node, inferior nodes and terminal nodes, wherein each node stores values for an address and an opcode, wherein said opcode specifies:
a particular field of a plurality of fields of data packet headers; and
an operation that is to be performed on the data stored in said particular field,
wherein said operation is one of a plurality of operations that said opcode can specify;
receiving a data packet at an input interface on a router or switch, wherein the data packet includes information in at least a header with at least a field that is used by said M-trie data structure to indicate an action; and routing said data packet at one or more output interfaces on said router or switch based on the looked up information for a router to perform in order to select a leaf associated with said M-trie data structure;
looking up the information, wherein the looking up includes performing the action; and
routing said data packet at one or more output interfaces on said router or switch based on the looked up information.

17. A method as recited in claim 16, further comprising routing said data packet at one or more output interfaces on said router or said switch.

18. A method as recited in claim 16, further comprising determining, based on one or more Access Control List (ACL) criteria stored in said M-trie data structure, whether to drop or forward said data packet.

19. A method as recited in claim 18, wherein determining whether to drop or forward said data packet comprises matching said information to the one or more ACL criteria stored in said M-trie data structure.

20. A method as recited in claim 18, wherein said one or more ACL criteria include at least one of a source address, a destination address, and upper-layer protocol information.

21. A method as recited in claim 18, wherein said one or more ACL criteria are stored in a sub-tree of said M-trie data structure.

22. A computer readable memory storing a program for performing a method for routing or switching data packets, comprising:
   storing in memory an M-trie data structure, said data structure organized as a multi-level tree having a set of nodes, including a root node, inferior nodes and terminal nodes, wherein each node stores values for an address and an opcode, wherein said opcode specifies:
      a particular field of a plurality of fields of data packet headers; and
      an operation that is to be performed on the data stored in said particular field,
         wherein said operation is one of a plurality of operations that said opcode can specify;
   receiving a data packet at an input interface on a router or switch, wherein the data packet includes information in at least a header with at least a field that is used by said M-trie data structure to indicate an action for a router to perform in order to select a leaf associated with said M-trie data structure;
   looking up the information, wherein the looking up includes performing the action; and
   routing said data packet at one or more output interfaces on said router or said switch based on the looked up information.

23. A memory as in claim 22, wherein said address includes an address of a node in said M-trie data structure that is to be traversed.

24. A memory as in claim 22, wherein said M-trie data structure includes a set of access control parameters.

25. A memory as in claim 22, wherein said M-trie data structure includes a set of Quality of Service (QoS) parameters.

26. A memory as in claim 22, wherein said expanded M-trie data structure includes a set of Class of Service (CoS) parameters.

27. A memory as in claim 22 wherein at least one of the root node, inferior nodes, or the terminal node includes an opcode for demultiplexing, an opcode for matching, and an opcode for hashing.

28. A memory as in claim 27 wherein said opcode for demultiplexing includes instructions to demultiplex into branches of the M-trie data structure based on contents of a byte of said packet header.

29. A memory as in claim 27, wherein said opcode for matching includes instructions to compare the contents of a given byte of a flow label to given node data.

30. A memory as in claim 27, wherein said opcode for hashing includes instructions to hash into different branches the M-trie data structure based on the contents of a given set of bytes in said packet header.

* * * * *